O. SCHUTT.
JOURNAL BEARING.
APPLICATION FILED DEC. 17, 1910.
995,916.
Patented June 20, 1911.
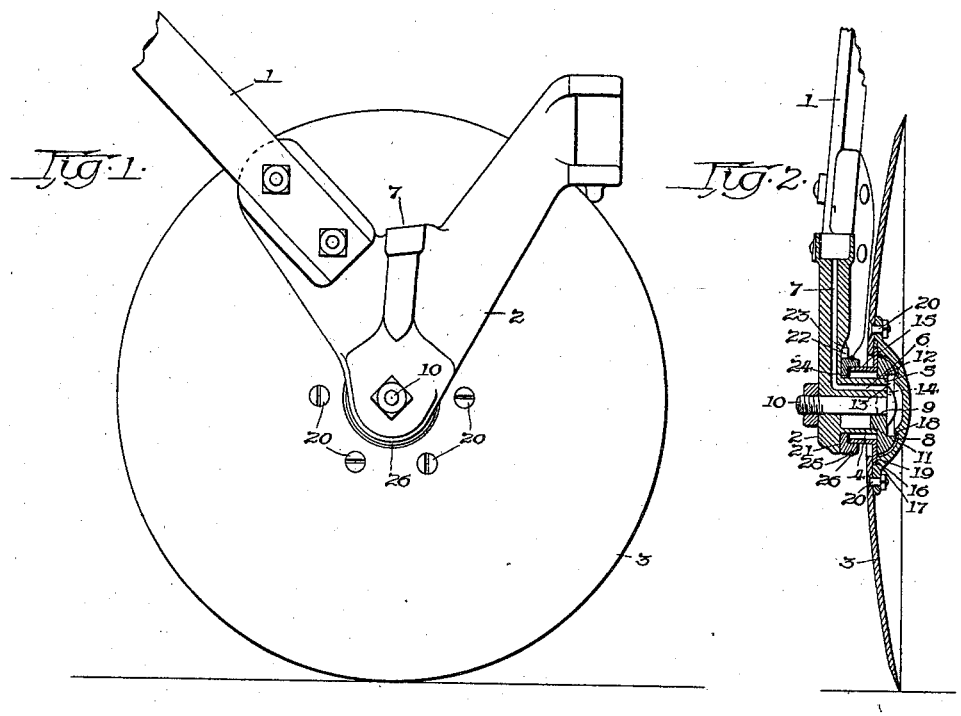
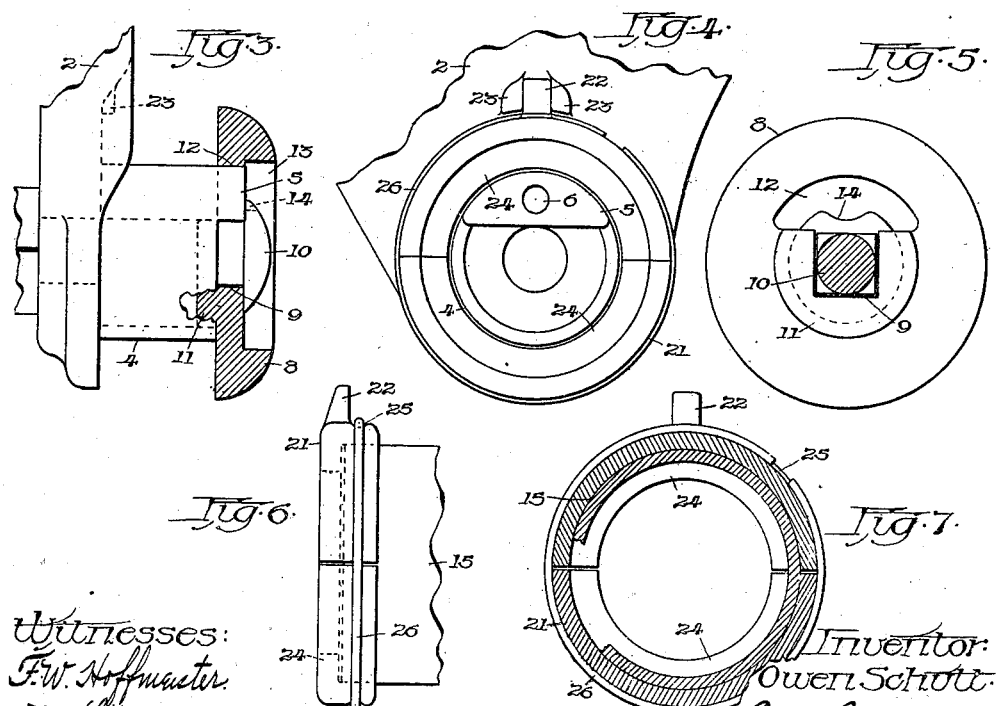
Witnesses:
F. W. Hoffmaster
Inventor:
Owen Schutt
By E. W. Burgess
Attorney.

UNITED STATES PATENT OFFICE.

OWEN SCHUTT, OF HAMILTON, ONTARIO, CANADA, ASSIGNOR TO INTERNATIONAL HARVESTER COMPANY, A CORPORATION OF NEW JERSEY.

JOURNAL-BEARING.

995,916.      Specification of Letters Patent.    Patented June 20, 1911.

Application filed December 17, 1910. Serial No. 597,837.

*To all whom it may concern:*

Be it known that I, OWEN SCHUTT, a citizen of the United States, residing at Hamilton, in the county of Wentworth, Province of Ontario, Dominion of Canada, have invented certain new and useful Improvements in Journal-Bearings, of which the following is a specification.

My invention relates to grain drills, and in particular to the construction of the journal bearing forming part of the disk furrow opener as used in connection with machines of the character indicated; the object of my invention being to provide a journal bearing having efficient means for the exclusion of dirt and satisfactory means for supplying lubricant to the operative parts of the mechanism, and of only few parts, simple in construction and readily assembled. I attain these objects by means of the mechanism illustrated in the accompanying drawing, in which—

Figure 1 represents a side elevation of a disk furrow opener having my invention embodied in its construction; Fig. 2 is a vertical sectional elevation of Fig. 1; Fig. 3 is a detail designed to show the manner of constructing the bearing block; Fig. 4 is an end elevation of the bearing thimble integral with the disk support, and also an assembled view of the two-part dust excluding ring; Fig. 5 is a side elevation of the bearing cap; Fig. 6 is an edge view of the two-part dust excluding ring; and Fig. 7 is an end elevation of Fig. 6.

The same reference numerals designate like parts throughout the several views.

1 represents a drag bar having a disk supporting bracket 2 secured thereto; 3 is a concavo-convex disk journaled upon a bearing secured to the bracket. The bearing includes a laterally-projecting cylindrical thimble 4 integral therewith and having a chordal reinforcement 5 extending throughout the length of the thimble and beyond its outer end, and provided with a lubricant duct 6 that communicates with a vertically-arranged duct 7 in the body of the bracket.

8 is a circular bearing block having an angular central opening 9 adapted to receive the square portion of a standard form of carriage bolt 10 that secures the block to the outer end of the thimble, the block being provided with an inwardly-projecting semi-circular boss 11 having a flattened upper side that engages with the chordal extension of the thimble in a manner to secure the block against rotation, the extension also being received by a semi-circular opening 12 through the block that communicates with a circular counterbore 13 in the outer surface thereof that receives the head of the bolt, the latter having a notch 14 in its periphery that registers with the lubricant duct 6, the periphery of the block being substantially semi-spherical in form outward from its inner flat surface.

15 represents a cylindrical shell passing through a central opening in the disk and surrounding the thimble is provided with a bore larger in diameter than the exterior diameter of the thimble, and a flange 16 at its outer end that contacts with the inner surface of the block 8 and is received between the outer surface of the disk and the inner surface of a cup-shaped casing 17 secured to the disk and inclosing the block, the casing being provided with an annular rib 18 upon its interior surface that projects slightly within the counterbored portion of the block in a manner to insure a proper distribution of lubricant relative to the bearing, and an annular recess 19 that receives the flange 16 of the shell, the rim of the casing extending beyond the recess and provided with openings whereby it is secured to the disk by means of bolts or rivets 20.

21 represents a dust excluding and lubricant retaining ring mounted upon the inner end of the thimble 4 and held against rotation by means of an upwardly-extending horn 22 integral with the ring and received between two lugs 23 integral with the bracket 2. The ring is provided with an interior flange 24 disposed between the inner end of shell 15 and the bracket and bearing upon the inner end of thimble 4. The ring is formed in two segmental parts and provided with a circumferential groove 25 upon its periphery, in which is seated a spring ring 26 operative to yieldingly hold the two segmental parts of the ring in close contact with the shell and thimble in a manner to exclude dirt from and prevent the escape of lubricant from the bearing. The adjacent ends of the segmental parts are spaced apart, as shown in Figs. 6 and 7, for the purpose of permitting the spring ring to bring the parts together and thus maintain a close contact of the ring with the shell and the flange thereof with the thimble.

What I claim as my invention, and desire to secure by Letters Patent, is:

1. A journal bearing including, in combination, a rotary element having a central opening therein, a support for said rotary element including a bracket, a thimble integral with said bracket and projecting laterally therefrom, and a bearing block secured to the outer end of said thimble, a cup-shaped casing secured to the said rotary element and inclosing said bearing block, a shell surrounding said thimble and secured to said rotary element, and a sectional dust excluding ring having a rim portion engaging with the periphery of said shell at its inner end and an internal flange portion engaging with the inner portion of the periphery of said thimble.

2. A journal bearing including, in combination, a rotary element having a central opening therein, a support for said rotary element including a bracket, a thimble integral with said bracket and projecting laterally therefrom, and a bearing block secured to the outer end of said thimble, a shell surrounding said thimble and having a flange portion contacting with said rotary element, a cup-shaped casing inclosing said bearing block and said flange portion of said shell and secured to said rotary element, a sectional dust excluding ring having a rim portion engaging with the periphery of said shell at its inner end, and an internal flange engaging with the inner portion of the periphery of said thimble, and means for preventing rotation of said ring.

3. A journal bearing including, in combination, a rotary element having a central opening therein, a support for said rotary element including a bracket, a thimble integral with said bracket and projecting laterally therefrom, and a bearing block secured to the outer end of said thimble, a shell surrounding said thimble and having a flange portion contacting with the surface of said rotary element, the body of the shell passing through the opening in said rotary element, a cup-shaped casing inclosing said bearing block and said flange portion of said shell and secured to said rotary element, a two-part dust excluding ring mounted upon the inner end of said shell and held against rotation therewith, said ring having an internal annular flange extending between the end of the shell and said bracket and having a bearing upon the inner end of the periphery of said thimble, and means for securing said two-part ring in operative position.

4. A journal bearing including, in combination, a rotary element provided with a central opening, a support for said rotary element including a bracket, a thimble integral with said bracket and projecting laterally therefrom through the opening in said rotary element, and a bearing block secured to the outer end of said thimble, a shell surrounding said thimble and having a flange at its outer end engaging with the outer surface of said rotary element near its central opening and the inner surface of said bearing block, the body of said shell passing through the opening in said rotary element, a cup-shaped casing inclosing said bearing block and said flange portion of said shell and secured to said rotary element, a two-part dust excluding ring mounted upon the inner end of said shell and held against rotation therewith, said ring having an internal annular flange extending between the end of said shell and said bracket and an annular groove upon its periphery, and a spring ring seated in said groove and operative to yieldingly hold said two-part ring in engagement with said shell.

5. A journal bearing including, in combination, a rotary element having a central opening therein, a support for said rotary element including a bracket, a thimble integral with said bracket and projecting laterally therefrom, a chordal reinforcement extending longitudinally through the interior of said thimble and projecting beyond its outer end, and a bearing block secured to the outer end of said thimble and having an opening therein adapted to receive said chordal extension, a shell surrounding said thimble and having a flange thereon engaging with said rotary element, and a cup-shaped casing inclosing said bearing block and flange and secured to said rotary element.

6. A journal bearing including, in combination, a rotary element having a central opening therein, a support for said rotary element including a bracket, a thimble integral with said bracket and projecting laterally therefrom through the opening in said rotary element, a chordal reinforcement extending longitudinally through the interior of said thimble and projecting beyond its outer end, and a bearing block secured to the outer end of said thimble and having an opening therein adapted to receive said chordal extension, said bracket being provided with a vertically-arranged lubricant duct, said chordal reinforcement being provided with a longitudinally-arranged lubricant duct communicating with said vertical duct, a shell surrounding said thimble and passing through the opening in said rotary element, and having a flange thereon at its outer end engaging with said rotary element, and a cup-shaped casing inclosing said bearing block and flange and secured to said rotary element.

OWEN SCHUTT.

Witnesses:
 JAS. M. SHEPARD,
 E. B. WRIGHT.

Copies of this patent may be obtained for five cents each, by addressing the "Commissioner of Patents, Washington, D. C."